Nov. 3, 1936.    A. E. ROBERTS    2,059,913
VEHICLE BRAKE
Filed March 10, 1936    2 Sheets-Sheet 2
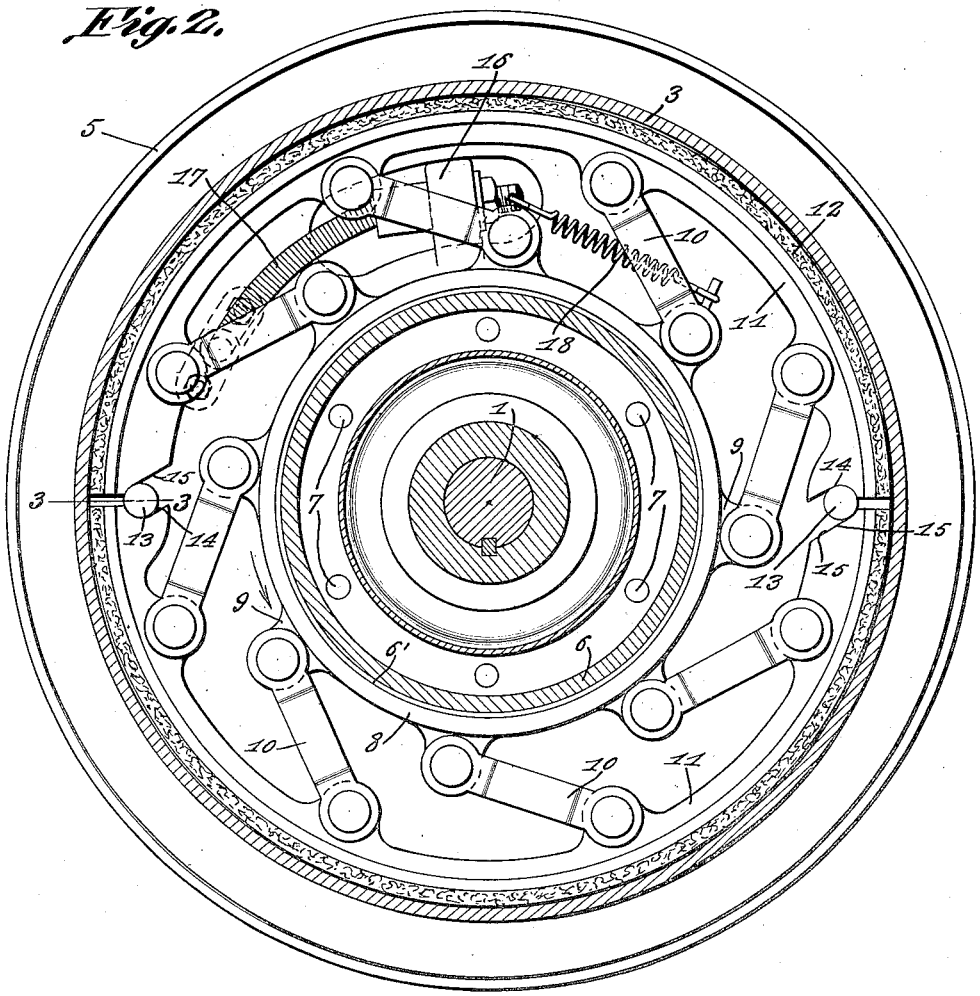
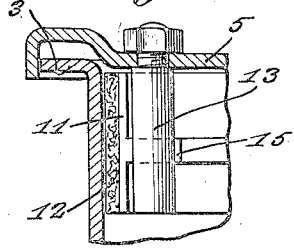

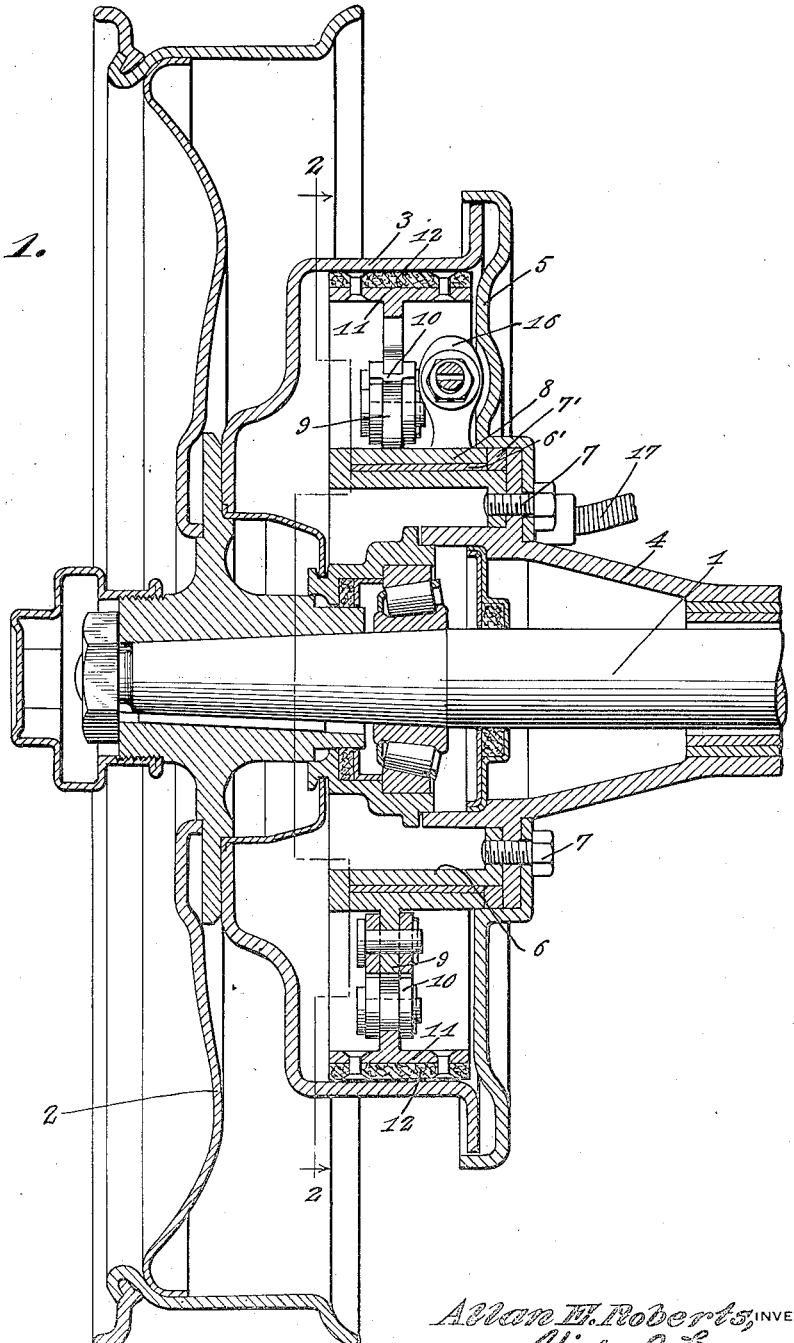

Patented Nov. 3, 1936

2,059,913

UNITED STATES PATENT OFFICE 2,059,913

VEHICLE BRAKE

Allan E. Roberts, St. Louis, Mo.

Application March 10, 1936, Serial No. 68,096

2 Claims. (Cl. 188—78)

This invention relates to motor vehicle brakes and has for the primary object the provision of a self-adjusting device of this character which eliminates manual adjustments during its life and which will have the life thereof materially increased by equal distribution of pressure on the brake drums by the brake shoes and throughout the length of said brake shoes and the device is so constructed that repairs may be easily and quickly made without disturbing the adjustment of the brake operating means.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary sectional view showing a motor vehicle wheel and axle construction equipped with a brake constructed in accordance with my invention.

Figure 2 is a sectional view taken on the line 2—2 of Figure 1.

Figure 3 is a detail sectional view taken on the line 3—3 of Figure 2.

Referring in detail to the drawings, the numeral 1 indicates a motor vehicle axle to which is keyed a wheel 2 having a brake drum 3. The axle 1 is journaled in an axle housing 4 equipped with a guard plate 5 for the brake drum 3.

An annular bearing 6 of the flanged type is secured to the guard plate or shield 5, as shown at 7, and is located within the drum for supporting a shoe operating ring 8 for rotation in either direction. An annular bushing 6' is located between the ring 8 and the bearing 6, being held in place by the flange of the latter and a spacer 7' which also acts to properly position the operating ring 8. A series of ears 9 are formed on the ring and have pivoted thereto links 10 which are in turn pivotally connected to brake shoes 11. The brake shoes are arranged in pairs and have secured thereto brake linings 12 to contact the brake drum 3. Pins 13 are secured to the shield plate 5 and protrude into the drum for engagement with the ends of the brake shoes. One end of each brake shoe is notched, as shown at 14, to contact the pin adjacent thereto. The other end of each shoe is beveled, as shown at 15, to ride against the pin adjacent thereto. The pins act as guides for the movement of the brake shoes towards and from the drum.

A lug 16 is formed on the brake operating ring and to which is detachably secured a brake operating medium 17 and also a coil spring 18 acts on said lug urging the ring in one direction to move the brake shoes away from the drum, while the brake operating means 17 when operated moves the ring in an opposite direction or in the direction indicated by the arrow in Figure 2 to bring about application of the brake shoes to the drum. This mode of operating the brake shoes consisting of the links and the operating ring efficiently brings about an equal distribution of the braking force of each shoe throughout its length onto the braking drum, consequently providing more efficient braking action with an increased life to the brake lining and also provides a brake which will be self-adjusting eliminating manual adjustment during the life of the brake lining.

Each brake shoe is of a curvature to conform to the contour of the brake drum and each is of a length substantially equal to one-half of the diameter of the brake drum.

Having described the invention, I claim:

1. In combination with a brake drum and a fixed mounting, brake shoes to contact the drum and each of a length substantially equal to one-half of the diameter of the drum, a brake operating ring journaled on said mounting, links pivoted to said ring and to the brake shoe, a lug formed on the ring and having connected thereto a brake operating means, a spring means connected to the lug and to the mounting, stop pins secured to the mounting and each shoe having one end notched to engage the pin adjacent thereto and the opposite end beveled to contact said pin.

2. In combination with a brake drum and a fixed mounting, brake shoes to contact the drum, stops carried by said mounting to engage the ends of the shoes, an annular journal secured to said mounting and flanged at one edge thereof, a bushing mounted on said journal and abutting the flanged edge of the journal at one edge thereof, a spacer arranged between the other edge of the bushing and the mounting, a brake operating ring mounted on said bushing between the flanged edge of the journal and the spacer, links pivoted to said ring and to the brake shoes, brake operating means connected to said ring, and a spring connected to the ring and to the mounting.

ALLAN E. ROBERTS.